US012554605B2

(12) United States Patent
De Vita et al.

(10) Patent No.: US 12,554,605 B2
(45) Date of Patent: Feb. 17, 2026

(54) SELF-CONTAINED AND CONFIGURABLE DEBUGGING MECHANISM FOR STREAM-BASED HARDWARE ACCELERATORS

(71) Applicant: STMicroelectronics International N.V., Geneva (CH)

(72) Inventors: Antonio De Vita, Milan (IT); David Siorpaes, Cortina D'Ampezzo (IT); Thomas Boesch, Rovio (CH); Giuseppe Desoli, San Fermo Della Battaglia (IT)

(73) Assignee: STMicroelectronics International N.V., Geneva (CH)

( * ) Notice: Subject to any disclaimer, the term of this patent is extended or adjusted under 35 U.S.C. 154(b) by 55 days.

(21) Appl. No.: 18/513,380

(22) Filed: Nov. 17, 2023

(65) Prior Publication Data

US 2025/0165362 A1 May 22, 2025

(51) Int. Cl.
*G06F 11/30* (2006.01)
*G06F 11/22* (2006.01)

(52) U.S. Cl.
CPC ........ *G06F 11/221* (2013.01); *G06F 11/2268* (2013.01); *G06F 11/3041* (2013.01)

(58) Field of Classification Search
CPC .............. G06F 11/221; G06F 11/2268; G06F 11/3466; G06F 11/348; G06F 11/349; G06F 11/30; G06F 11/3003; G06F 11/3041
See application file for complete search history.

(56) References Cited

U.S. PATENT DOCUMENTS

| 11,301,295 | B1 | | 4/2022 | Gupta et al. | |
|---|---|---|---|---|---|
| 11,336,287 | B1 | * | 5/2022 | Rodriguez | .......... G06F 15/7825 |
| 2004/0250164 | A1 | * | 12/2004 | Ahmad | ............... G06F 11/364 |
| | | | | | 714/E11.214 |
| 2005/0144403 | A1 | * | 6/2005 | Jeddeloh | ............. G06F 11/3466 |
| | | | | | 711/154 |
| 2005/0257005 | A1 | * | 11/2005 | Jeddeloh | ............. G06F 12/0862 |
| | | | | | 711/E12.004 |
| 2013/0042143 | A1 | | 2/2013 | Melzer et al. | |

(Continued)

OTHER PUBLICATIONS

Wikipedia's Bus Analyzer Historical version published May 13, 2023 https://en.wikipedia.org/w/index.php?title=Bus_analyzer&oldid=1154671583 (Year: 2023).*

*Primary Examiner* — Joseph O Schell
(74) *Attorney, Agent, or Firm* — Seed IP Law Group LLP

(57) ABSTRACT

A hardware accelerator includes a plurality of functional circuits, a stream switch, a plurality of direct memory access (DMA) channels coupled to the plurality of functional circuits via the stream switch to stream data to and from functional circuits of the plurality of functional circuits, and a debug and trace unit coupled to the stream switch, wherein in operation, the debug and trace unit monitors a set of data signals to and from the stream switch via wired probes and implements one or more event counters, one or more triggers, and one or more tracers using components internal to the hardware accelerator including one or more registers of the hardware accelerator, and wherein the one or more tracers output trace data packets via the stream switch.

34 Claims, 6 Drawing Sheets

(56) References Cited

U.S. PATENT DOCUMENTS

| | | | |
|---|---|---|---|
| 2013/0346802 A1* | 12/2013 | Freking | G06F 13/1605 |
| | | | 714/32 |
| 2014/0068344 A1* | 3/2014 | Miller | G06F 11/3636 |
| | | | 714/45 |
| 2016/0378460 A1* | 12/2016 | Chiou | G06F 11/0709 |
| | | | 717/168 |
| 2016/0380819 A1* | 12/2016 | Burger | G06F 11/0793 |
| | | | 709/221 |
| 2019/0303328 A1* | 10/2019 | Balski | G06F 15/7807 |
| 2020/0272779 A1* | 8/2020 | Boesch | G06N 3/0495 |
| 2022/0374326 A1* | 11/2022 | Fleckenstein | G06F 11/3065 |
| 2023/0376437 A1* | 11/2023 | Clarke | G06F 15/8007 |

* cited by examiner

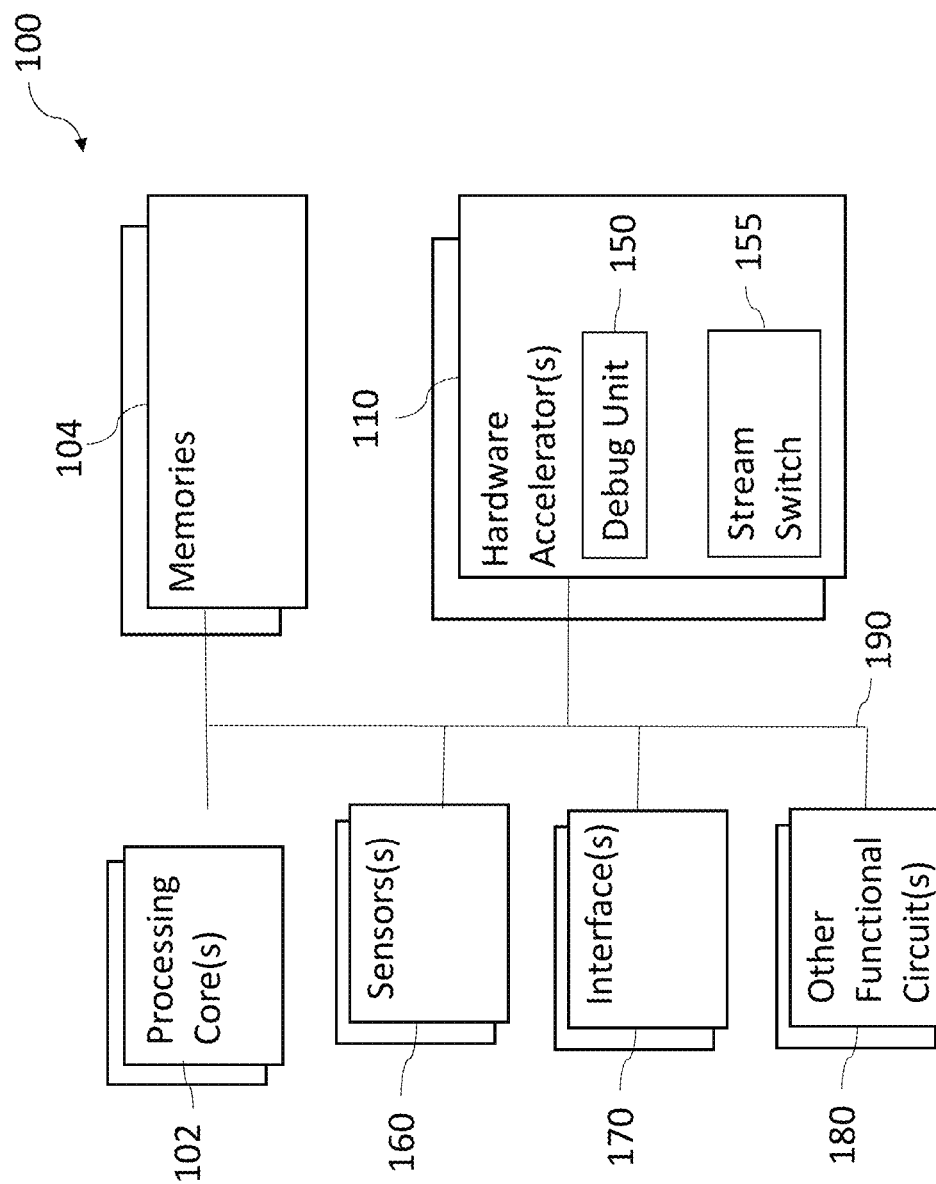

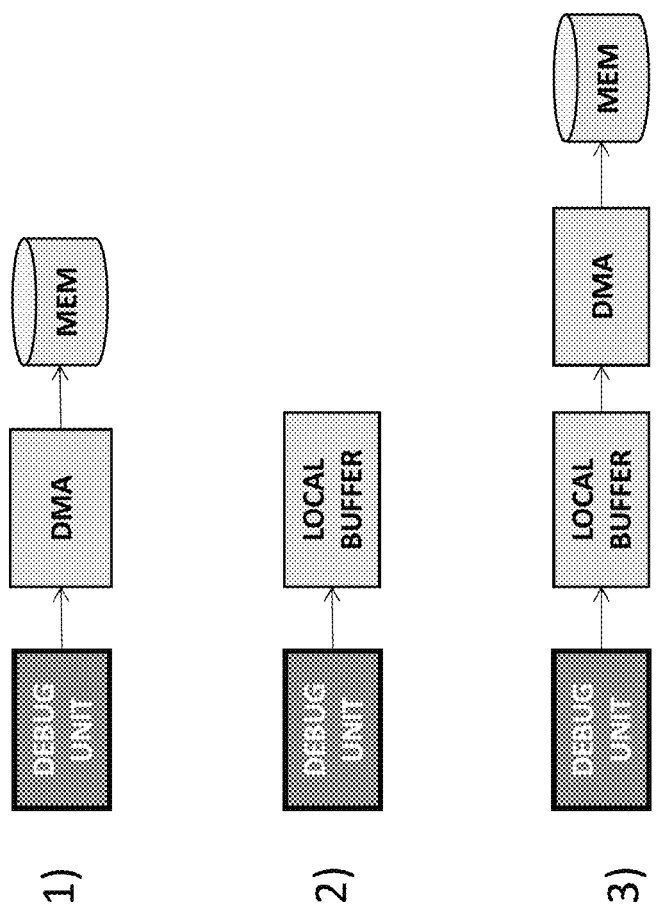

SELF-CONTAINED AND CONFIGURABLE DEBUGGING MECHANISM FOR STREAM-BASED HARDWARE ACCELERATORS

BACKGROUND

Technical Field

The present disclosure generally relates to hardware debug architecture and mechanism, and in particular, in the context of stream-based hardware accelerators.

Description of the Related Art

Hardware debug architectures are designed to provide developers with the ability to monitor and control the behavior of a computing system during runtime. They typically include specialized hardware components and require dedicated interfaces, dedicated communication bus, and dedicated memory to function.

BRIEF SUMMARY

One of the main challenges in hardware debug architectures for hardware accelerators is the difficulty, inflexibility, and cost of adding all the required resources. Unlike processors or microcontrollers, which often have built-in debugging interfaces or resources, hardware accelerators typically need the addition of extra, dedicated hardware and resources for debugging purposes. The dedicated hardware and resources can include specialized buses for data transfer, dedicated memories for storing data, and other hardware resources for monitoring and analyzing the behavior of the accelerator. Adding these dedicated resources can be difficult and costly, and at times causing a variety of debugging inflexibilities.

In some embodiments of the presently disclosed technology, a hardware accelerator includes a plurality of functional circuits; a stream switch; a plurality of direct memory access (DMA) channels coupled to the plurality of functional circuits via the stream switch to stream data to and from functional circuits of the plurality of functional circuits; and a debug and trace unit coupled to the stream switch, wherein in operation, the debug and trace unit monitors a set of data signals to and from the stream switch via wired probes and implements one or more event counters, one or more triggers, and one or more tracers using components internal to the hardware accelerator including one or more registers of the hardware accelerator, and wherein the one or more tracers output trace data packets via the stream switch.

In some embodiments, a system includes a host device and a hardware accelerator. The hardware accelerator includes a plurality of functional circuits; a stream switch; a plurality of direct memory access (DMA) channels coupled to the plurality of functional circuits via the stream switch to stream data to and from functional circuits of the plurality of functional circuits; and a debug and trace unit coupled to the stream switch, wherein in operation, the debug and trace unit monitors a set of data signals to and from the stream switch via wired probes and implements one or more event counters, one or more triggers, and one or more tracers using components internal to the hardware accelerator including one or more registers of the hardware accelerator, and wherein the one or more tracers output trace data packets via the stream switch.

In some embodiments, a method includes streaming data between a plurality of direct memory access (DMA) channels of a hardware accelerator and a plurality of functional circuits of the hardware accelerator via a stream switch; implementing debug and trace functions within the hardware accelerator based on configurations obtained via configuration registers; monitoring data signals to and from the stream switch; and outputting trace data via the stream switch.

In some embodiments, a non-transitory computer-readable medium has contents which cause a system including one or more processors to perform actions. The actions include streaming data between a plurality of direct memory access (DMA) channels of a hardware accelerator and a plurality of functional circuits of the hardware accelerator via a stream switch; implementing debug and trace functions within the hardware accelerator based on configurations obtained via configuration registers; monitoring data signals to and from the stream switch; and outputting trace data via the stream switch.

BRIEF DESCRIPTION OF THE SEVERAL VIEWS OF THE DRAWINGS

One or more embodiments are described hereinafter with reference to the accompanying drawings.

FIG. 1 is a functional block diagram of an embodiment of an electronic device or system of the type to which described embodiments may apply.

FIG. 3 is a conceptual diagram illustrating example implementations of data output from a debug and trace unit, in accordance with some embodiments.

DETAILED DESCRIPTION

Figure 2A:
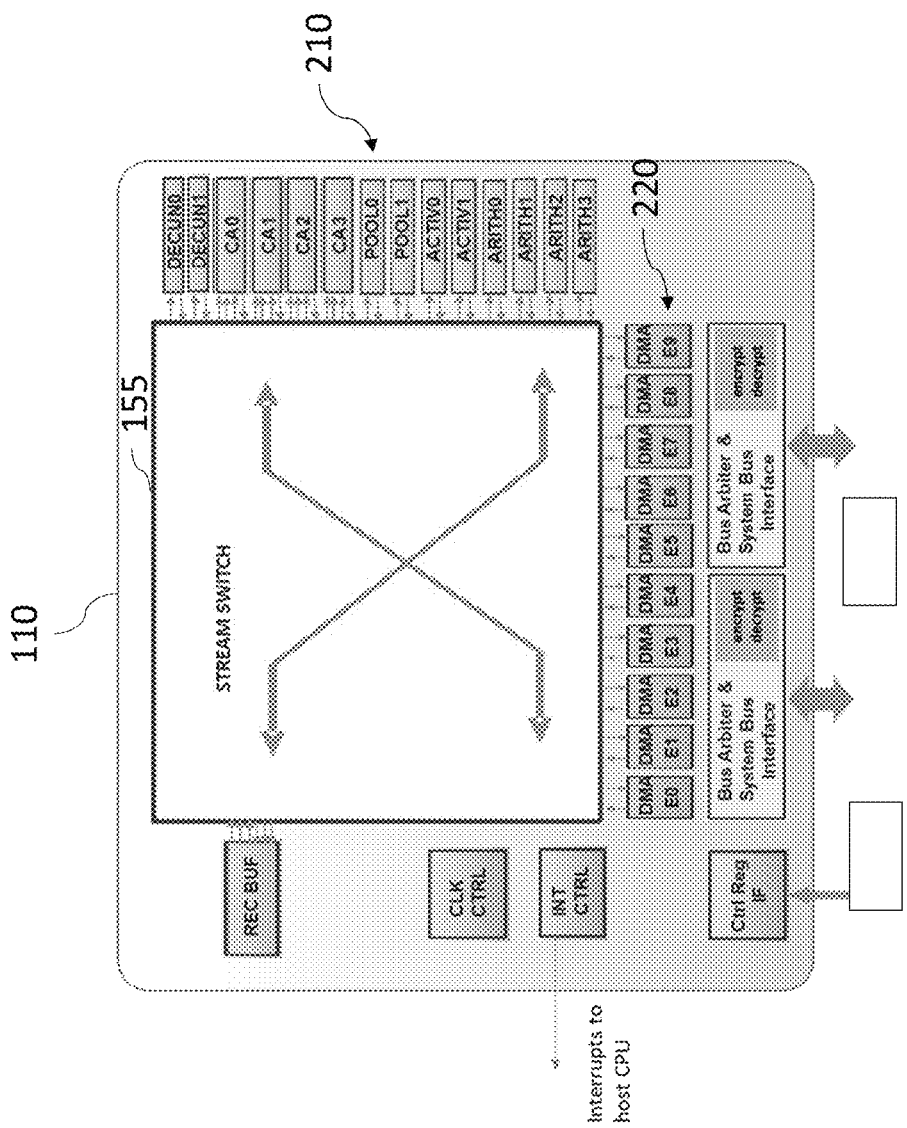
FIGS. 2A and 2B are block diagrams illustrating the integration of an example debug and trace unit into an example hardware accelerator, in accordance with some embodiments.

The following description, along with the accompanying drawings, sets forth certain specific details in order to provide a thorough understanding of various disclosed embodiments. However, one skilled in the relevant art will recognize that the disclosed embodiments may be practiced in various combinations, with or without one or more of these specific details, or with other methods, components, devices, materials, etc. In other instances, well-known structures or components that are associated with the environment of the present disclosure, including but not limited to interfaces, power supplies, physical component layout, convolutional accelerators, Multiply-ACcumulate (MAC) circuitry, control or configuration registers, bus systems, etc., in a programmable hardware accelerator environment, have not been shown or described in order to avoid unnecessarily obscuring descriptions of the embodiments. Additionally, the various embodiments may be methods, systems, devices, computer program products, etc.

Throughout the specification, claims, and drawings, the following terms take the meaning associated herein, unless the context indicates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context indicates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context indicates otherwise. In addition, throughout the specification, the meaning of "a," "an," and "the" include singular and plural references.

FIG. 1 is a functional block diagram of an embodiment of an electronic device or system 100 of the type to which described embodiments may apply. The system 100 comprises one or more processing cores or circuits 102. The processing cores 102 may comprise, for example, one or more processors, a state machine, a microprocessor, a programmable logic circuit, discrete circuitry, logic gates, registers, etc., and various combinations thereof. The processing cores may control overall operation of the system 100, execution of application programs by the system 100 (e.g., programs which classify images using convolutional neural networks (CNNs)), etc.

The system 100 includes one or more memories 104, such as one or more volatile and/or non-volatile memories which may store, for example, all or part of instructions and data related to control of the system 100, applications and operations performed by the system 100, etc. One or more of the memories 104 may include a memory array, which, in operation, may be shared by one or more processes executed by the system 100.

The system 100 may include one or more sensors 160 (e.g., image sensors, audio sensors, accelerometers, pressure sensors, temperature sensors, etc.), one or more interfaces 170 (e.g., wireless communication interfaces, wired communication interfaces, etc.), and other circuits 180, which may include antennas, power supplies, one or more built-in self-test (BIST) circuits, etc., and a main bus system 190. The main bus system 190 may include one or more data, address, power and/or control buses coupled to the various components of the system 100.

The system 100 also includes one or more hardware accelerators 110 which, in operation, accelerate the performance of one or more operations, e.g., associated with implementing a CNN. The hardware accelerator 110 as illustrated includes one or more functional circuitry (e.g., convolutional accelerator, pooling layer module, activation unit, etc.) The hardware accelerator 110 also includes a stream switch 155 or other interconnect, a debug and trace unit 150, and one or more direct memory access (DMA) channels (not shown). The DMA channels, in operation, facilitate transmission of data streams. For example, the DMA channels may facilitate streaming data, such as feature data or kernel data stored in memory 104, to and from a convolutional accelerator via the stream switch 155. The debug and trace unit 150 is connected to the stream switch 155 in a same or similar way as one of the functional circuitry. In some embodiments, the stream switch 155 uses a protocol that is shared between all components or circuitry connected to the stream switch 155.

Figure 2B:
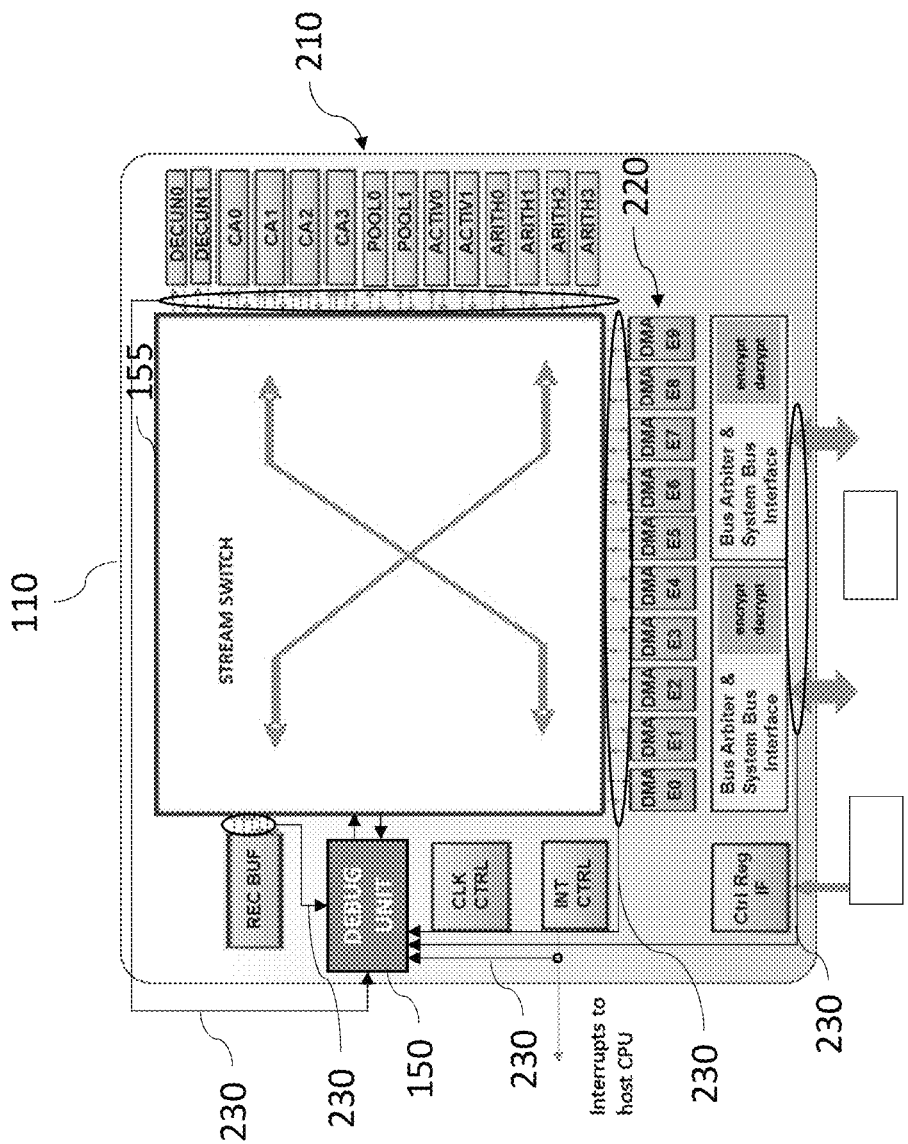

FIGS. 2A and 2B are block diagrams illustrating the integration of an example debug and trace unit 150 into an example hardware accelerator 110. FIG. 2A shows an example hardware accelerator 110 without or before the integration of a debug and trace unit 150. As described above, the hardware accelerator 110 includes one or more functional circuitry 210 and one or more DMA channels 220, which are coupled via their connections to the stream switch 155.

FIG. 2B shows the example hardware accelerator 110 with a debug and trace unit 150 integrated. The debug and trace unit 150 does not require dedicated memories, dedicated buses, or dedicated debugging interfaces. Also, no external debug instrumentation is required to fetch trace data or information. Debug information can be retrieved by reading the internal configuration registers of the hardware accelerator 110 or accessing to the memories of the hardware accelerator 110. The debug and trace unit 150 can provide one or more of the following functionalities:

Triggers: output signals from the debug and trace unit which are asserted if the specified event happens.

Event Counters: internal counters for events which can be accessed at any time by a user.

Tracers: collecting information and creating packets that are sent via the stream switch 155 or other interconnection network of the hardware accelerator in which it resides.

The debug and trace unit 150 allows for a high level of configuration flexibility (e.g., configuring the number or interaction of the triggers, event counters, and tracers) based on configuration registers of the hardware accelerator 110. An additional level of flexibility can be achieved in the trace post-processing phase where software analyzers can extract or synthesize the desired information from the stream contents (e.g., including trace data packets generated by the tracers).

As shown in FIG. 2B, the debug and trace unit 150 has wired probes 230 to monitor data signals at various locations in the hardware accelerator 230. For example, data signals between the stream switch 155 and functional circuitry 210, between the stream switch 155 and DMA channels 220, and between the stream switch 155 and internal buffer(s) of the hardware accelerator can be monitored using the wired probes 230. As another example, data signals corresponding to interrupts to host processor(s) (e.g., processing core(s) 102) as well as data signals between DMA channels 220 and memories (e.g., memories 104) external to the hardware accelerator 110 can be monitored using the wired probes 230.

As described above, the debug and trace unit 150 is implemented by using internal elements (e.g., registers) of the hardware accelerator 110, without requiring additional memories, debugging interfaces, dedicated bus, or external debug instrumentation. The debug and trace unit 150 is connected to the stream switch 155 in a same or similar way as one of the functional circuitry 210, allowing the debug and trace unit 150 to stream data (e.g., trace data packets) via the stream switch 155. The debug and trace unit 150 can share a bus (e.g., a communication bus corresponding to the stream switch 155) with some or all other components (e.g., the functional circuitry 210) of the hardware accelerator 110. The bus interface can support prioritized access, and the access by or to the debug and trace unit 150 has the lowest priority to avoid intrusive debugging or otherwise interfering with the system behavior of the hardware accelerator 110. For example, the streaming of trace data packets will not change the order or timing of other data packets on the bus.

FIG. 3 is a conceptual diagram illustrating example implementations of data output from the debug and trace unit 150.

As shown in FIG. 3, under example implementation 1), one or more of unused DMA channels 220 can be allocated to the debug and trace unit 150 for outputting data (e.g., trace data packets). Illustratively, the tracer(s) of the debug and trace unit 150 can stream trace data packets via the stream switch 155 to the allocated DMA channel(s) 220, which can further transfer the trace data packets to external memory. Here, the access by or to the debug and trace unit 150 has the lowest priority on the bus for data transfer.

Under example implementation 2), one or more of the internal buffers of the hardware accelerator 110 can be allocated to the debug and trace unit 150 for outputting data (e.g., trace data packets). Illustratively, the tracer(s) of the debug and trace unit 150 can stream trace data packets via the stream switch 155 to the allocated internal buffer(s). At the end of normal operations by other components of the hardware accelerator 110, content in the local buffer(s) can be streamed (e.g., via the stream switch 155) to external memory through one or more DMA channels 220. In this case, the output data size or memory space is limited to the depth of the allocated local buffer(s).

Under example implementation 3), one or more of the internal buffers of the hardware accelerator 110 can be allocated to the debug and trace unit 150 for outputting data (e.g., trace data packets) and the allocated internal buffer(s) are further connected to one or more unused DMA channels 220 via the stream switch 155. Illustratively, the tracer(s) of the debug and trace unit 150 can stream trace data packets via the stream switch 155 to the allocated internal buffer(s), which in turn can further stream the trace data packets via the stream switch 155 to the DMA channel(s) 220 and thereby transferring to external memory. In this case, the output data size or memory space is not limited to the depth of the allocated local buffer(s) due to continuous flow of data, increasing the bandwidth for transferring debugging data. Here, the access by or to the debug and trace unit 150 as well as the allocated local buffer(s) has the lowest priority on the bus for data transfer.

Figure 4:
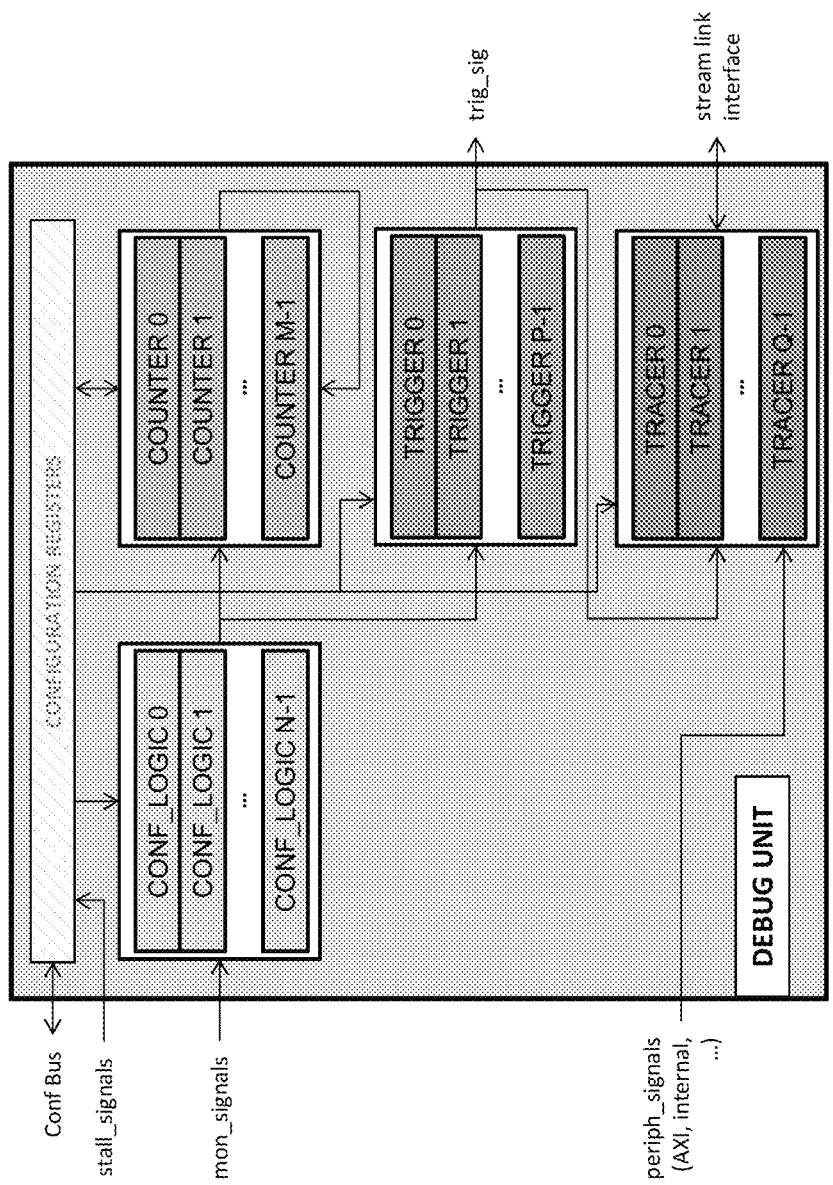
FIG. 4 shows an example implementation of a debug and trace unit, in accordance with some embodiments.

FIG. 4 shows an example implementation of a debug and trace unit, such as the debug and trace unit 150 in FIG. 2B. In this example implementation, the number of monitored signals (mon_signals) is design-time configurable. These are signals that can be collected and monitored (e.g., using wired probes) across the hardware accelerator where the debug and trace unit is integrated. Configurable logic (CONF_LOGIC) is used to combine mon_signals and add even more flexibility to the observable events. COUNTERS and TRIGGERS work on the output from the configurable logic, and TRACERS are connected to triggers and output trace data via stream link interface to a stream switch or other interconnect of the hardware accelerator.

Figure 5:
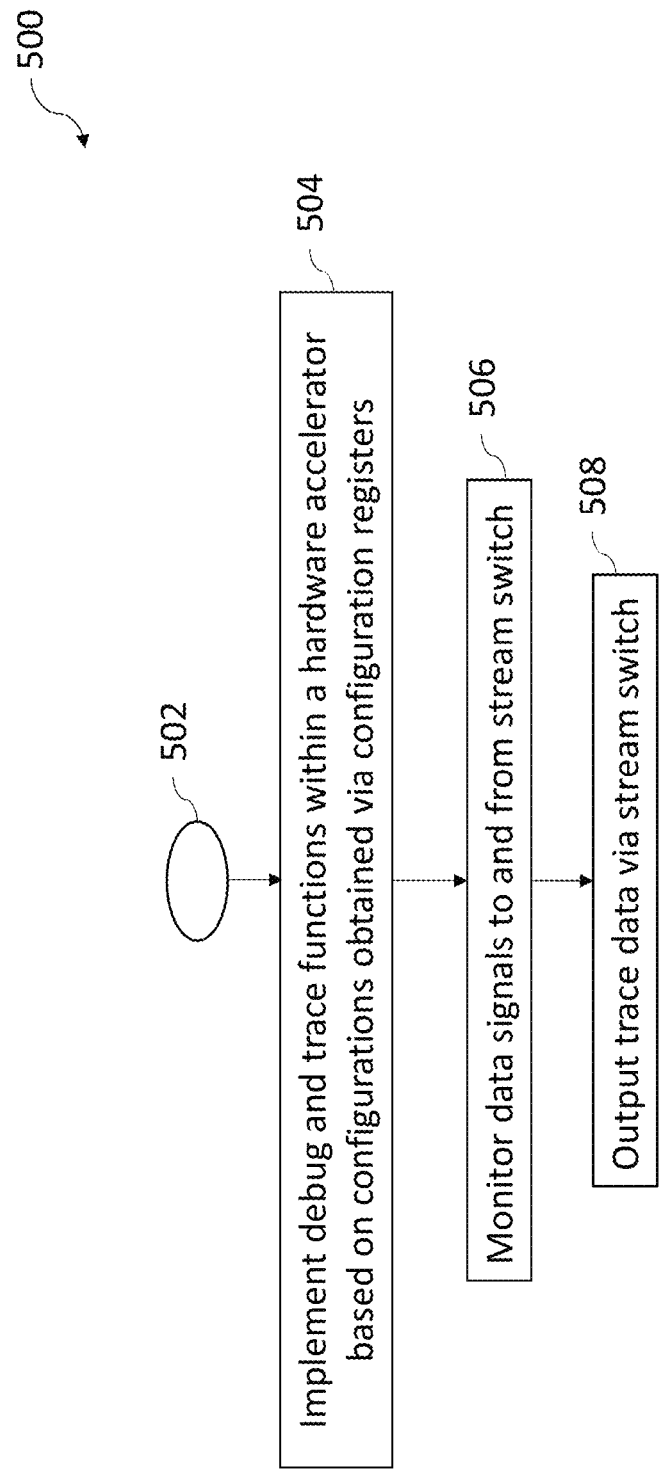
FIG. 5 illustrates a logical flow diagram generally showing an embodiment of a method for debugging and tracing.

FIG. 5 illustrates a logical flow diagram generally showing an embodiment of a method 500 for debugging and tracing, which may be performed, for example, at least in part by a hardware accelerator 110 using a debug and trace unit 150 as discussed above with reference to FIGS. 1-4.

The method 500 starts at 502, and proceeds to 504. At 504, the method 500 includes implementing debug and trace functions within the hardware accelerator based on configurations obtained via configuration registers. As described above, implementing the debug and trace functions within the hardware accelerator does not require dedicated memories, dedicated buses, or dedicated debugging interfaces. Implementing the debug and trace functions can include sharing a bus with the functional circuits. The access by or to the debug and trace functions has a lowest priority on the shared bus to avoid interfering with system behavior of the hardware accelerator.

The configuration registers of the hardware accelerator can include configuration information to configure the number, interaction, or other aspects of one or more event counters, one or more triggers, or one or more tracers corresponding to the debug and trace functions.

At 506, the method 500 includes monitoring data signals to and from at least the stream switch of the hardware accelerator, e.g., through wired probes. This monitoring is performed passively, independently, or otherwise without affecting the streaming of data via the stream switch.

At 508, the method 500 includes outputting trace data via the stream switch. Illustratively, the trace data is output via the stream switch to at least one of DMA channels coupled to the stream switch. Alternatively or in addition, the trace data is output via the stream switch to at least a local buffer of the hardware accelerator, which is further used to output the trace data to at least one of the DMA channels via the stream switch.

Embodiments of the foregoing processes and methods may contain additional acts not shown in FIG. 5, may not contain all of the acts shown in FIG. 5, may perform acts shown in FIG. 5 in various orders, may combine acts, may split acts into separate acts, and may be otherwise modified in various respects.

In some embodiments, a hardware accelerator includes a plurality of functional circuits; a stream switch; a plurality of direct memory access (DMA) channels coupled to the plurality of functional circuits via the stream switch to stream data to and from functional circuits of the plurality of functional circuits; and a debug and trace unit coupled to the stream switch, wherein in operation, the debug and trace unit monitors a set of data signals to and from the stream switch via wired probes and implements one or more event counters, one or more triggers, and one or more tracers using components internal to the hardware accelerator including one or more registers of the hardware accelerator, and wherein the one or more tracers output trace data packets via the stream switch.

In some embodiments, the debug and trace unit does not require at least one of dedicated memories, dedicated buses, or dedicated debugging interfaces. In some embodiments, the debug and trace unit shares a bus with the plurality of functional circuits. In some embodiments, access to the debug and trace unit has a lowest priority on the shared bus to avoid interfering with system behavior of the hardware accelerator.

In some embodiments, a quantity of at least one of the one or more event counters, one or more triggers, or one or more tracers is subject to configuration. In some embodiments, the configuration is performed based on one or more configuration registers of the hardware accelerator.

In some embodiments, the trace data packets are output via the stream switch to at least one of the DMA channels. In some embodiments, the trace data packets are output via the stream switch to at least a local buffer of the hardware accelerator. In some embodiments, the local buffer is coupled to at least one of the DMA channels via the stream switch.

In some embodiments, a system includes a host device and a hardware accelerator. The hardware accelerator includes a plurality of functional circuits; a stream switch; a plurality of direct memory access (DMA) channels coupled to the plurality of functional circuits via the stream switch to stream data to and from functional circuits of the plurality of functional circuits; and a debug and trace unit coupled to the stream switch, wherein in operation, the debug and trace unit monitors a set of data signals to and from the stream switch via wired probes and implements one or more event counters, one or more triggers, and one or more tracers using components internal to the hardware accelerator including one or more registers of the hardware accelerator, and wherein the one or more tracers output trace data packets via the stream switch.

In some embodiments, the debug and trace unit does not require at least one of dedicated memories, dedicated buses, or dedicated debugging interfaces. In some embodiments, the debug and trace unit shares a bus with the plurality of functional circuits. In some embodiments, access to the debug and trace unit has a lowest priority on the shared bus to avoid interfering with system behavior of the hardware accelerator.

In some embodiments, a quantity of at least one of the one or more event counters, one or more triggers, or one or more tracers is subject to configuration. In some embodiments, the configuration is performed based on one or more configuration registers of the hardware accelerator.

In some embodiments, the trace data packets are output via the stream switch to at least one of the DMA channels. In some embodiments, the trace data packets are output via the stream switch to at least a local buffer of the hardware accelerator. In some embodiments, the local buffer is coupled to at least one of the DMA channels via the stream switch.

In some embodiments, a method includes streaming data between a plurality of direct memory access (DMA) channels of a hardware accelerator and a plurality of functional circuits of the hardware accelerator via a stream switch; implementing debug and trace functions within the hardware accelerator based on configurations obtained via configuration registers; monitoring data signals to and from the stream switch; and outputting trace data via the stream switch.

In some embodiments, implementing the debug and trace functions within the hardware accelerator does not require at least one of dedicated memories, dedicated buses, or dedicated debugging interfaces. In some embodiments, implementing the debug and trace functions comprises sharing a bus with the plurality of functional circuits. In some embodiments, access to the debug and trace functions has a lowest priority on the shared bus to avoid interfering with system behavior of the hardware accelerator.

In some embodiments, the configuration registers include configuration information to configure at least one of one or more event counters, one or more triggers, or one or more tracers corresponding to the debug and trace functions.

In some embodiments, the trace data is output via the stream switch to at least one of the DMA channels. In some embodiments, the trace data is output via the stream switch to at least a local buffer of the hardware accelerator. In some embodiments, the local buffer is further used to output the trace data to at least one of the DMA channels via the stream switch.

In some embodiments, a non-transitory computer-readable medium has contents which cause a system including one or more processors to perform actions. The actions include streaming data between a plurality of direct memory access (DMA) channels of a hardware accelerator and a plurality of functional circuits of the hardware accelerator via a stream switch; implementing debug and trace functions within the hardware accelerator based on configurations obtained via configuration registers; monitoring data signals to and from the stream switch; and outputting trace data via the stream switch.

In some embodiments, implementing the debug and trace functions within the hardware accelerator does not require at least one of dedicated memories, dedicated buses, or dedicated debugging interfaces. In some embodiments, implementing the debug and trace functions comprises sharing a bus with the plurality of functional circuits. In some embodiments, access to the debug and trace functions has a lowest priority on the shared bus to avoid interfering with system behavior of the hardware accelerator.

In some embodiments, the configuration registers include configuration information to configure at least one of one or more event counters, one or more triggers, or one or more tracers corresponding to the debug and trace functions.

In some embodiments, the trace data is output via the stream switch to at least one of the DMA channels. In some embodiments, the trace data is output via the stream switch to at least a local buffer of the hardware accelerator. In some embodiments, the local buffer is further used to output the trace data to at least one of the DMA channels via the stream switch.

Some embodiments may take the form of or comprise computer program products. For example, according to one embodiment there is provided a computer readable medium comprising a computer program or other computer-executable instructions adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A hardware accelerator, comprising:
a plurality of functional circuits;
a stream switch;
a plurality of direct memory access (DMA) channels coupled to the plurality of functional circuits via the stream switch to stream data to and from functional circuits of the plurality of functional circuits; and
a debug and trace unit coupled to the stream switch, wherein in operation, the debug and trace unit monitors, via wired probes, a set of data signals for interrupts from the hardware accelerator to one or more host processors and a set of data signals between the stream switch and at least one of (a) one or more of the functional circuits or (b) one or more of the DMA channels, and implements one or more event counters, one or more triggers, and one or more tracers using components internal to the hardware accelerator including one or more registers of the hardware accelerator, and wherein the one or more tracers output trace data packets via the stream switch.

2. The hardware accelerator of claim 1, wherein the debug and trace unit does not require at least one of dedicated memories, dedicated buses, or dedicated debugging interfaces.

3. The hardware accelerator of claim 2, wherein the debug and trace unit shares a bus with the plurality of functional circuits.

4. The hardware accelerator of claim 3, wherein access to the debug and trace unit has a lowest priority on the shared bus to avoid interfering with system behavior of the hardware accelerator.

5. The hardware accelerator of claim 1, wherein a quantity of at least one of the one or more event counters, one or more triggers, or one or more tracers is subject to configuration.

6. The hardware accelerator of claim 5, wherein the configuration is performed based on one or more configuration registers of the hardware accelerator.

7. The hardware accelerator of claim 1, wherein the trace data packets are output via the stream switch to at least one of the DMA channels.

8. The hardware accelerator of claim 1, wherein the trace data packets are output via the stream switch to at least a local buffer of the hardware accelerator.

9. The hardware accelerator of claim 8, wherein the local buffer is coupled to at least one of the DMA channels via the stream switch.

10. A system, comprising:
a host device; and
a hardware accelerator, the hardware accelerator including:
a plurality of functional circuits;
a stream switch;
a plurality of direct memory access (DMA) channels coupled to the plurality of functional circuits via the stream switch to stream data to and from functional circuits of the plurality of functional circuits; and
a debug and trace unit coupled to the stream switch, wherein in operation, the debug and trace unit monitors, via wired probes, a set of data signals between the stream switch and one or more internal buffers of the hardware accelerator and a set of data signals between the stream switch and at least one of (a) one or more of the functional circuits or (b) one or more of the DMA channels, and implements one or more event counters, one or more triggers, and one or more tracers using components internal to the hardware accelerator including one or more registers of the hardware accelerator, and wherein the one or more tracers output trace data packets via the stream switch.

11. The system of claim 10, wherein the debug and trace unit does not require at least one of dedicated memories, dedicated buses, or dedicated debugging interfaces.

12. The system of claim 11, wherein the debug and trace unit shares a bus with the plurality of functional circuits.

13. The system of claim 12, wherein access to the debug and trace unit has a lowest priority on the shared bus to avoid interfering with system behavior of the hardware accelerator.

14. The system of claim 10, wherein a quantity of at least one of the one or more event counters, one or more triggers, or one or more tracers is subject to configuration.

15. The system of claim 14, wherein the configuration is performed based on one or more configuration registers of the hardware accelerator.

16. The system of claim 10, wherein the trace data packets are output via the stream switch to at least one of the DMA channels.

17. The system of claim 10, wherein the trace data packets are output via the stream switch to at least a local buffer of the hardware accelerator.

18. The system of claim 17, wherein the local buffer is coupled to at least one of the DMA channels via the stream switch.

19. A method, comprising:
streaming data between a plurality of direct memory access (DMA) channels of a hardware accelerator and a plurality of functional circuits of the hardware accelerator via a stream switch;
implementing debug and trace functions within the hardware accelerator based on configurations obtained via configuration registers;
monitoring, via wired probes, data signals between one or more of the DMA channels and memories external to the hardware accelerator and data signals between the stream switch and at least one of (a) one or more of the functional circuits or (b) one or more of the DMA channels; and
outputting trace data via the stream switch.

20. The method of claim 19, wherein implementing the debug and trace functions within the hardware accelerator does not require at least one of dedicated memories, dedicated buses, or dedicated debugging interfaces.

21. The method of claim 20, wherein implementing the debug and trace functions comprises sharing a bus with the plurality of functional circuits.

22. The method of claim 21, wherein access to the debug and trace functions has a lowest priority on the shared bus to avoid interfering with system behavior of the hardware accelerator.

23. The method of claim 19, wherein the configuration registers include configuration information to configure at least one of one or more event counters, one or more triggers, or one or more tracers corresponding to the debug and trace functions.

24. The method of claim 19, wherein the trace data is output via the stream switch to at least one of the DMA channels.

25. The method of claim 19, wherein the trace data is output via the stream switch to at least a local buffer of the hardware accelerator.

26. The method of claim 25, wherein the local buffer is further used to output the trace data to at least one of the DMA channels via the stream switch.

27. A non-transitory computer-readable medium having contents which cause a system including one or more processors to perform actions comprising:
streaming data between a plurality of direct memory access (DMA) channels of a hardware accelerator and a plurality of functional circuits of the hardware accelerator via a stream switch;

implementing debug and trace functions within the hardware accelerator based on configurations obtained via configuration registers;

monitoring, via wired probes without requiring dedicated buses, data signals between the stream switch and at least one of (a) one or more of the functional circuits or (b) one or more of the DMA channels; and outputting trace data via the stream switch.

28. The non-transitory computer-readable medium of claim 27, wherein implementing the debug and trace functions within the hardware accelerator does not require at least one of dedicated memories, dedicated buses, or dedicated debugging interfaces.

29. The non-transitory computer-readable medium of claim 28, wherein implementing the debug and trace functions comprises sharing a bus with the plurality of functional circuits.

30. The non-transitory computer-readable medium of claim 29, wherein access to the debug and trace functions has a lowest priority on the shared bus to avoid interfering with system behavior of the hardware accelerator.

31. The non-transitory computer-readable medium of claim 27, wherein the configuration registers include configuration information to configure at least one of one or more event counters, one or more triggers, or one or more tracers corresponding to the debug and trace functions.

32. The non-transitory computer-readable medium of claim 27, wherein the trace data is output via the stream switch to at least one of the DMA channels.

33. The non-transitory computer-readable medium of claim 27, wherein the trace data is output via the stream switch to at least a local buffer of the hardware accelerator.

34. The non-transitory computer-readable medium of claim 33, wherein the local buffer is further used to output the trace data to at least one of the DMA channels via the stream switch.

* * * * *